(No Model.) 2 Sheets—Sheet 1.
T. MILTENBERGER.
HORSE HAY RAKE.
No. 457,091. Patented Aug. 4, 1891.
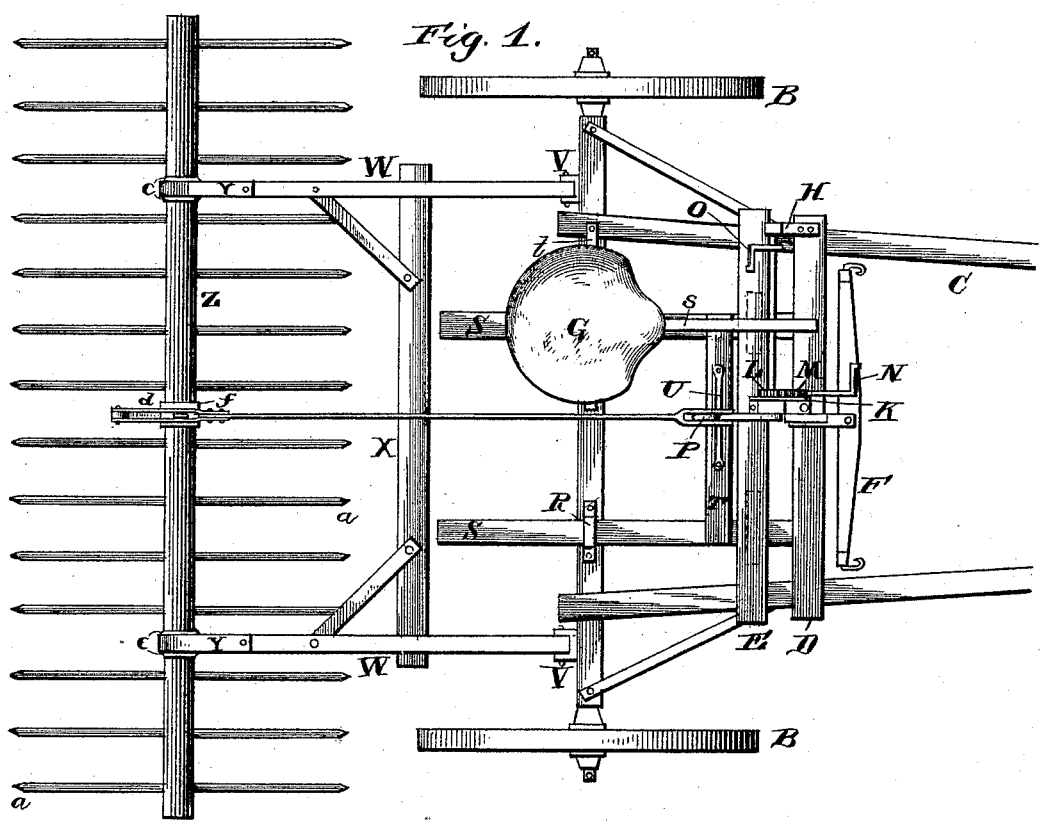
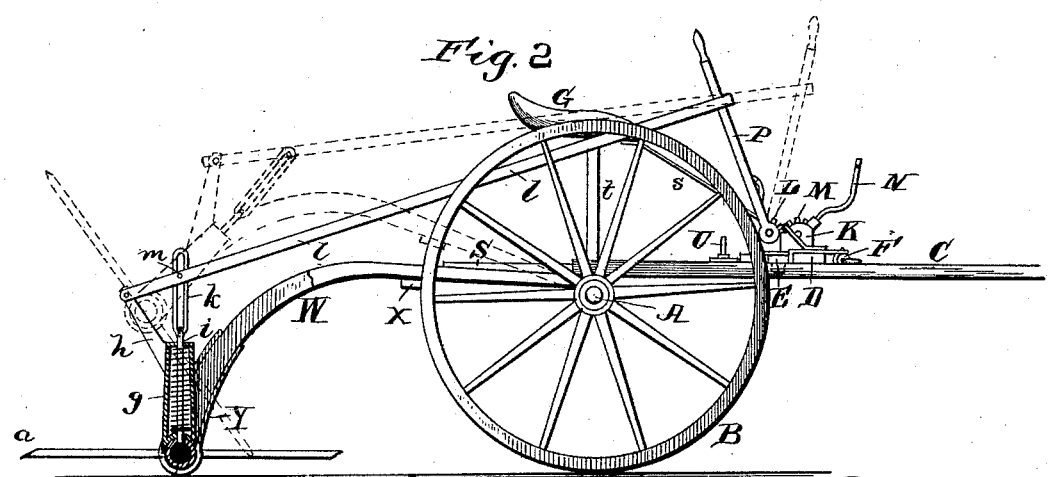
Witnesses:
J. B. McGirr.
Chas. F. Miller.
Inventor:
Thomas Miltenberger
by C. H. Campbell,
Atty.

(No Model.) 2 Sheets—Sheet 2.

T. MILTENBERGER.
HORSE HAY RAKE.

No. 457,091. Patented Aug. 4, 1891.

Witnesses:
J. B. McGinn
Chas. F. Miller

Inventor:
Thomas Miltenberger
by C. L. Campbell
Atty.

UNITED STATES PATENT OFFICE.

THOMAS MILTENBERGER, OF BELLEFONTAINE, OHIO.

HORSE HAY-RAKE.

SPECIFICATION forming part of Letters Patent No. 457,091, dated August 4, 1891.

Application filed October 9, 1890. Serial No. 367,590. (No model.)

*To all whom it may concern:*

Be it known that I, THOMAS MILTENBERGER, a citizen of the United States, and a resident of Bellefontaine, in the county of Logan and State of Ohio, have invented a new and useful Improvement in Hay-Rakes, of which the following is a specification.

My invention relates to certain improvements in revolving horse hay-rakes.

Figure 3:
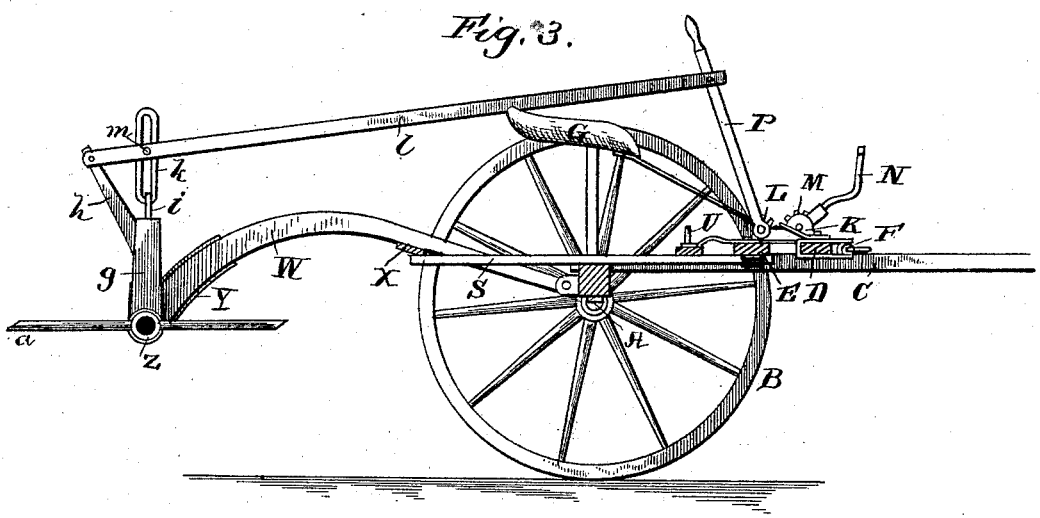
Figure 4:
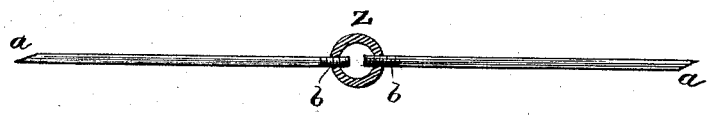

Figure 1 is a top view; Fig. 2, a side view with rake in raking position, the tilting position being shown in dotted lines, parts being shown in section; Fig. 3, a side view showing the rake in position for traveling to or from the field; Fig. 4, a sectional view crosswise of the rake-head, showing the manner of fastening in the teeth.

The construction and operation of my device are as follows:

To the axle A (connecting the wheels B) are attached the shafts C in the usual way. Two cross-pieces D E are attached to the shafts in front of the axle, and to the front one of these is attached the singletree F. Attached also to this piece D and extending backward is the plate H, turned over on itself to form a journal for the shaft I, the other end of which is journaled in the angle-plate K, in which are also pivoted the segment-gears L M, to the latter of which is attached the foot-lever N. On the outer end of shaft I is another foot-lever O, while on the inner end is the hand-lever P. On top of the axle are two bent iron straps R R, forming square slots or holes for the pieces S S to slide in. The front parts of these pieces S slide in similar slots underneath the cross-piece E. Near the front of the pieces S S they are connected by a cross-piece T, having a foot-rest U standing up from it. Extending out from the back of the axle and hinged to it at V V are the curved rake supports or arms W W, united near their middle by the cross-piece X and terminating in the collars Y Y, encircling the rake-head Z.

The rake-head Z is of metal, preferably tubular, and has screw-holes in two of its sides, opposite each other, into which fit the metallic teeth $a$, having the screw-threads $b$ on one end. The other end of the teeth are beveled to a point and arranged in the rake-head so that the bevel will always be on the under side of the front or raking teeth. Fastened permanently on the rake-head near each end and at the center are the collars $c$ $d$ $e$, having flanges $f$ on their sides.

The straps or collars Y on the rake-supports encircle the collars $c$ $e$ on the rake-head, and are prevented from slipping endwise on it by the flanges on the collars $c$ $e$. Mounted loosely on the middle collar $d$ on the rake-head is a hollow standard $g$, having a rearwardly and upwardly extending arm $h$ thereon and a bolt $i$, surrounded by a coiled spring in its center. The bolt $i$ is pivoted just above the standard to a loop $k$, and its lower end fits in a hole in either side of collar $d$. Pivoted to the upper end of arm $h$ is a bifurcated rod $l$, the front end of which is pivoted to the hand-lever P in front of the driver's seat. The loop $k$ of the bolt $i$ extends up through the bifurcated end of rod $l$, and a stationary pin $m$ in rod $l$ plays in the loop.

In operation in the field the rake-head rests on the collars $c$ $d$ $e$ and the teeth travel along in a horizontal position until they have gathered sufficient hay, when the operator in his seat G, supported on the legs $s$ $t$, throws the hand-lever P forward, tilting the rake forward, as shown in dotted lines in Fig. 3, the front ends of the teeth resting on the ground, when the forward movement of the machine revolves the rake and it drops onto the ground in front of the windrow with the other side up in position for raking again, the driver having thrown the hand-lever back to its original position as soon as the rake began to revolve. When the operator begins to throw the hand-lever forward, the standard $g$ and rake-head are tilted forward with it, (the pivoted loop accommodating itself to the movement of rod $l$,) the pin $m$ in rod $l$ sliding freely up in the loop $k$ of the bolt until the teeth of the rake take hold in the ground, when the pin $m$, having reached the top of the loop, raises it, withdrawing the lower end of the bolt from the hole in the collar $d$ and allowing the rake to revolve freely. When the operator moves the hand-lever (and with it rod $l$) back again, the pin $m$ slides down in the loop and the coil-spring forces the bolt down against the collar $d$, and when the rake revolves far enough to bring it into a horizontal position again the piston drops into the hole in the collar and locks the rake in position for raking. Should both the operator's hands be engaged in driving, he can tilt the rake forward by placing his left foot upon the foot-lever O and pushing forward, or can tilt the rake backward by pushing forward with his right foot on the foot-lever N. The lower end of this lever is pivoted and terminates in a segment-gear that engages with a similar gear on the shaft I, on which hand-lever P is mounted.

When the operator is through raking and wishes to leave the field, he tilts the teeth forward, as above recited, until they are in an upright position, when, with his foot on foot-rest U, he shoves the pieces S S backward until they are beneath the cross-piece X of the rake-supports W. When the rake completes its revolution, the cross-piece X drops upon the pieces S and the rake is swung free of the ground.

By means of the hand-lever P or the foot-levers O N the rake can be tilted backward or forward to clear obstructions or to ride over uneven ground.

When the rake is horizontal on the ground, the loop $k$, pivoted to bolt $i$ in the standard $g$, stands in line with the piston; but as the rake is tilted forward the pivotal point of the rod $l$ on arm $g$ has a different movement from that of the pin $m$, and it becomes necessary to pivot the loop $k$ and bolt together to allow the loop to accommodate itself to the eccentric movement of the pin $m$.

Hitherto revolving rake heads and teeth have been made of wood and the teeth made in one piece extending clear through the head; but the wooden teeth are easily broken and the ends of them become so battered and frayed that the hay catches on the ends in bunches and it becomes almost impossible to rake damp hay or clover-hay. In fact it is necessary to sharpen and smooth the points frequently to make them work successfully; but with my steel head smooth steel teeth can be used, beveled so as to slide over the ground and through the hay successfully with no trouble.

What I claim is—

1. In a revolving rake, the rake-head, the standard mounted on the rake-head, the bolt held in locking position by the coil-spring, the loop pivoted to the top of the bolt, and the connecting-rod attached to the arm of the standard and to the operating-lever, as and for the purpose set forth.

2. The revolving rake-head resting on the ground, the teeth extending out therefrom horizontally, the upright standard mounted on the rake-head, the spring-bolt, pivoted loop K, pin M, the connecting-rod and hand-lever, and the foot-levers and gear, as and for the purpose set forth.

3. The standard on the rake-head, the operating-rod, the pin $m$, the bolt, and the pivoted loop, as and for the purpose set forth.

THOMAS MILTENBERGER.

Witnesses:
M. H. McCORMICK,
B. M. UNDERWOOD.